United States Patent
Kinoshita et al.

(10) Patent No.: US 11,731,692 B2
(45) Date of Patent: Aug. 22, 2023

(54) DRIVING SUPPORT DEVICE THAT PERFORMS STEERING CONTROL AND DECELERATION CONTROL FOR AVOIDING AN OBJECT

(71) Applicant: Toyota Jidosha Kabushiki Kaisha, Toyota (JP)

(72) Inventors: Toshiki Kinoshita, Susono (JP); Shintaro Inoue, Kanagawa-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 287 days.

(21) Appl. No.: 16/884,463

(22) Filed: May 27, 2020

(65) Prior Publication Data
US 2021/0061350 A1    Mar. 4, 2021

(30) Foreign Application Priority Data

Aug. 27, 2019 (JP) .................................. 2019-154854

(51) Int. Cl.
*B62D 6/00* (2006.01)
*B60W 30/09* (2012.01)
*B60W 10/20* (2006.01)
*B60W 30/095* (2012.01)
*B60W 10/18* (2012.01)

(52) U.S. Cl.
CPC .............. *B62D 6/001* (2013.01); *B60W 10/18* (2013.01); *B60W 10/20* (2013.01); *B60W 30/09* (2013.01); *B60W 30/0956* (2013.01); *B60W 2554/20* (2020.02); *B60W 2554/4029* (2020.02)

(58) Field of Classification Search
CPC .............................. B60W 10/18; B62D 6/001
See application file for complete search history.

(56) References Cited

U.S. PATENT DOCUMENTS

| 10,793,147 | B2* | 10/2020 | Kaminade .............. B60Q 9/008 |
| 2011/0187515 | A1 | 8/2011 | Saito et al. |
| 2015/0210279 | A1 | 7/2015 | Agnew et al. |
| 2017/0349172 | A1* | 12/2017 | Kubota ........... B60W 30/18163 |
| 2018/0027224 | A1* | 1/2018 | Javidnia ................. G06V 10/44 382/154 |
| 2018/0107871 | A1* | 4/2018 | Singh .................... G01S 13/931 |

(Continued)

FOREIGN PATENT DOCUMENTS

| JP | 2010-070069 A | 4/2010 |
| JP | 2017-095100 A | 6/2017 |

(Continued)

*Primary Examiner* — Jess Whittington
(74) *Attorney, Agent, or Firm* — Dinsmore & Shohl LLP

(57) ABSTRACT

A driving support device performs steering control and deceleration control for avoiding an object which is detected in front of a host vehicle. The driving support device performs: calculating a target lateral distance which is a target of the steering control and which is a lateral distance between the host vehicle and the object when the host vehicle passes by the object; and increasing target deceleration which is a target of the deceleration control and which is deceleration of the host vehicle when the host vehicle passes by the object as a lateral distance restraint value which is obtained by subtracting the target lateral distance from a threshold value increases when the target lateral distance is less than the threshold value.

10 Claims, 7 Drawing Sheets

(56) References Cited

U.S. PATENT DOCUMENTS

| | | | |
|---|---|---|---|
| 2018/0275656 A1* | 9/2018 | Zhu | B60W 30/0953 |
| 2019/0212740 A1* | 7/2019 | Matsui | G05D 1/0088 |
| 2020/0089240 A1 | 3/2020 | Sasagawa et al. | |
| 2020/0122719 A1 | 4/2020 | Sasagawa et al. | |
| 2020/0307572 A1* | 10/2020 | Doi | B60W 30/18109 |
| 2021/0046928 A1* | 2/2021 | Ohmura | B60W 50/12 |
| 2021/0188356 A1* | 6/2021 | Goto | B62D 6/00 |
| 2022/0044554 A1* | 2/2022 | Rietdorf | G08G 1/167 |
| 2022/0222825 A1* | 7/2022 | Yaacobi | G06T 3/4007 |

FOREIGN PATENT DOCUMENTS

| | | |
|---|---|---|
| JP | 2019-086892 A | 6/2019 |
| JP | 2020-046926 A | 3/2020 |
| JP | 2020-066300 A | 4/2020 |

* cited by examiner

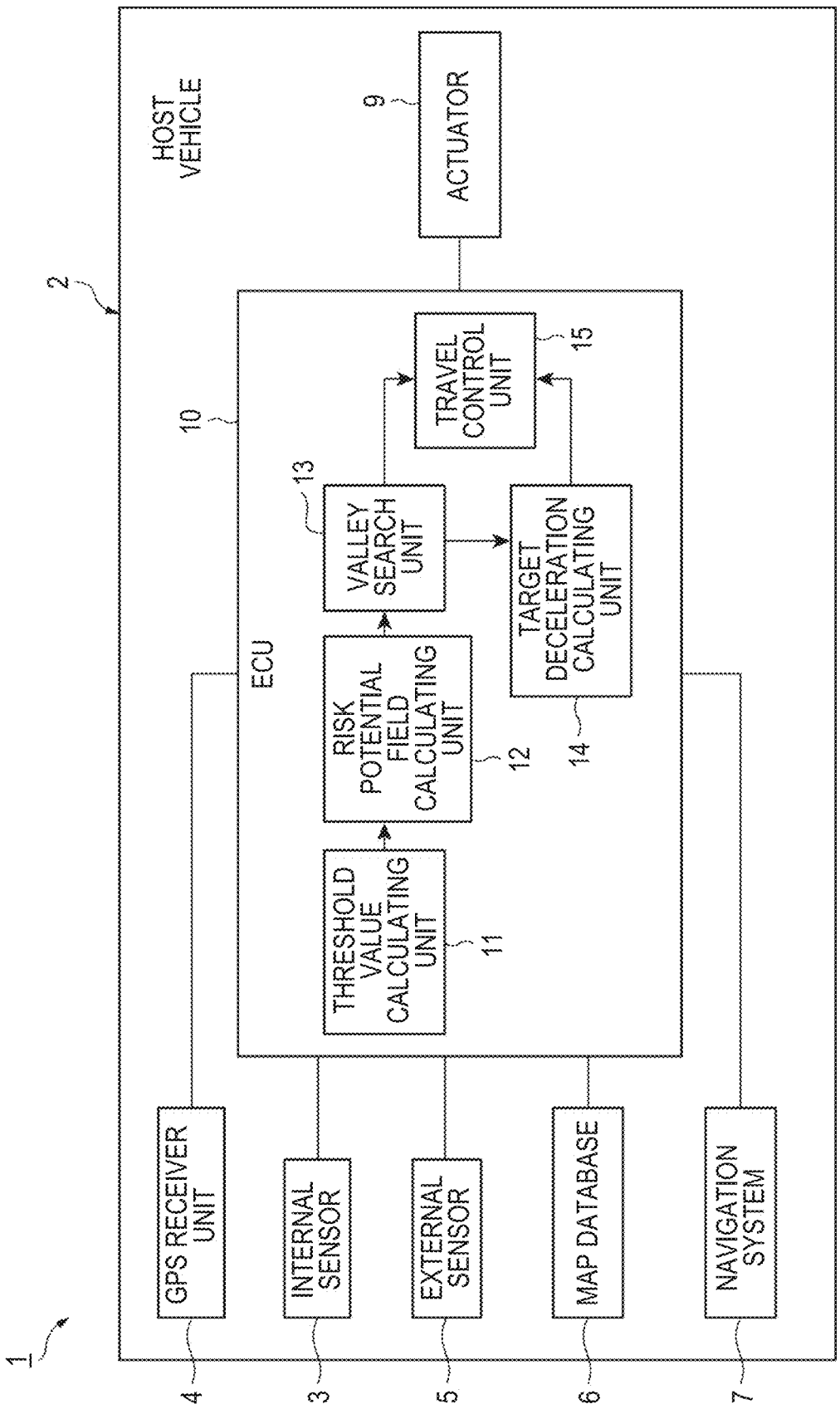

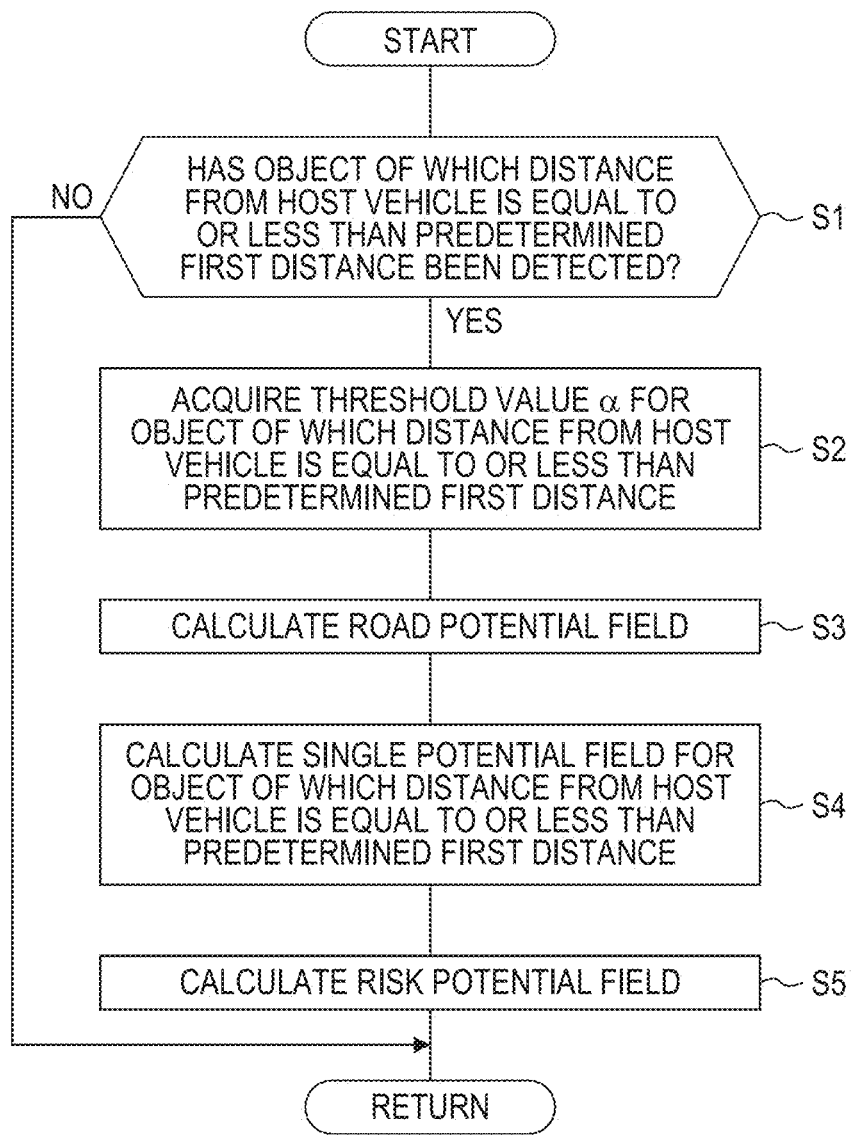

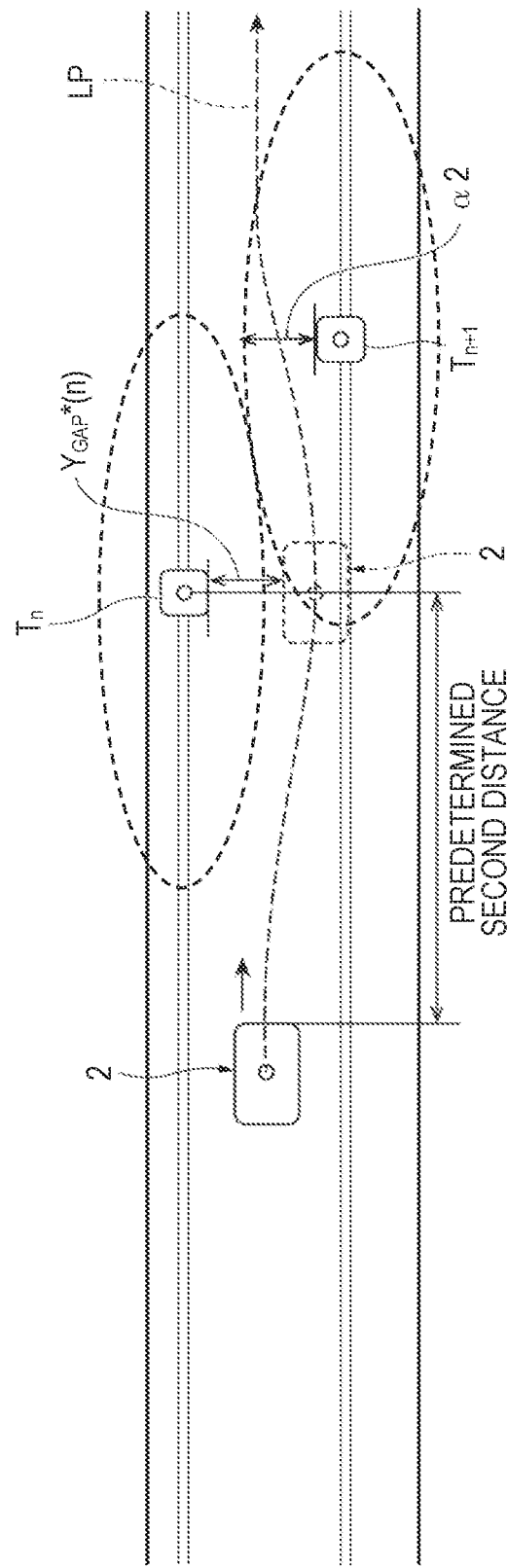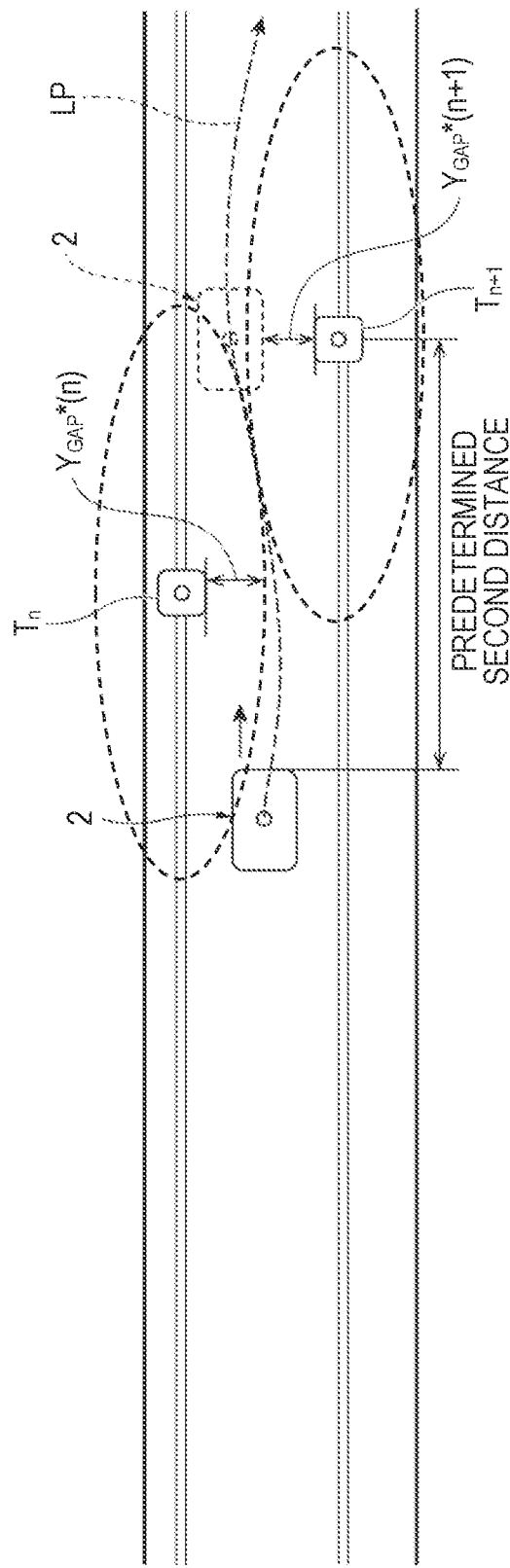

DRIVING SUPPORT DEVICE THAT PERFORMS STEERING CONTROL AND DECELERATION CONTROL FOR AVOIDING AN OBJECT

CROSS-REFERENCE TO RELATED APPLICATION

The disclosure of Japanese Patent Application No. 2019-154854 filed on Aug. 27, 2019 including the specification, drawings and abstract is incorporated herein by reference in its entirety.

BACKGROUND

1. Technical Field

The present disclosure relates to a driving support device.

2. Description of Related Art

As a technique of a driving support device, a collision avoidance system for a vehicle that avoids collision with a pedestrian (an object) is disclosed in Japanese Unexamined Patent Application Publication No. 2017-095100 (JP 2017-095100 A). In the technique described in JP 2017-095100 A, when a pedestrian is detected in front of a host vehicle, steering control is performed such that a locus keeping a constant distance from the pedestrian is drawn.

SUMMARY

In such a driving support device, when a plurality of objects is detected in front of the host vehicle, steering control is performed for each of the plurality of objects. At this time, control for decreasing a steering angle to curb meandering can be considered. In this case, there is a likelihood that an occupant of the host vehicle will feel a sense of discomfort (the host vehicle will pass through a position close to the object at a high speed) due to a decrease in a lateral distance between the host vehicle and the object.

The disclosure provides a driving support device that can curb an occupant's feeling of discomfort in a host vehicle.

According to a first aspect of the disclosure, there is provided a driving support device that performs steering control and deceleration control for avoiding an object which is detected in front of a host vehicle, the driving support device performing: calculating a target lateral distance which is a target of the steering control and which is a lateral distance between the host vehicle and the object when the host vehicle passes by the object; and increasing target deceleration which is a target of the deceleration control and which is deceleration of the host vehicle when the host vehicle passes by the object as a difference which is obtained by subtracting the target lateral distance from a threshold value increases when the target lateral distance is less than the threshold value.

In this driving support device, when the target lateral distance in steering control is less than the threshold value, the target deceleration in deceleration control is increased as the difference between the target lateral distance and the threshold value increases. Accordingly, when steering control and deceleration control for avoiding an object are performed, it is possible to prevent the host vehicle from passing through a position closer to the object at a high speed and to curb an occupant's feeling of discomfort in the host vehicle.

In one embodiment, the driving support device may include: a first processing unit configured to acquire the threshold value for each of one or more objects depending on types of the one or more objects; a second processing unit configured to calculate a risk potential field based on a vehicle speed of the host vehicle, a position of the host vehicle, a road width of a road on which the host vehicle is traveling, and positions of the one or more objects; a third processing unit configured to calculate the target lateral distance and the difference for each of the one or more objects based on the vehicle speed of the host vehicle, the position of the host vehicle, the risk potential field, and the threshold value for each of the one or more objects; and a fourth processing unit configured to increase the target deceleration for at least one of the one or more objects as the difference for the object increases when the target lateral distance for the object is less than the threshold value. Accordingly, steering control using the risk potential field and deceleration control linked therewith become possible.

In one embodiment, processing of the first processing unit and the second processing unit may be periodically repeatedly performed when one or more objects of which a distance from the host vehicle is equal to or less than a predetermined first distance are detected and processing of the third processing unit and the fourth processing unit may be periodically repeatedly performed when one or more objects of which a distance from the host vehicle is equal to or less than a predetermined second distance less than the predetermined first distance are detected. In this case, for example, when there is a plurality of objects of which the distance from the host vehicle is equal to or less than the predetermined first distance, it is possible to calculate a risk potential field in which the plurality of objects is considered as avoidance targets. The third process and the fourth process are performed after an object of which the distance from the host vehicle is equal to or less than the predetermined second distance has been detected, not after an object of which the distance from the host vehicle is equal to or less than the predetermined first distance has been detected. Accordingly, it is possible to curb an increase in a calculation load.

According to various aspects and embodiments of the disclosure, it is possible to curb an occupant's feeling of discomfort in a host vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a functional block diagram of a host vehicle including a driving support device according to a first embodiment;

FIG. 3 is a flowchart illustrating a process flow which is performed by the driving support device according to the first embodiment;

FIG. 6A is a diagram illustrating a scenario subsequent to FIG. 5B;

FIG. 6B is a diagram illustrating a scenario subsequent to FIG. 6A; and

DETAILED DESCRIPTION OF EMBODIMENTS

Figure 2A:
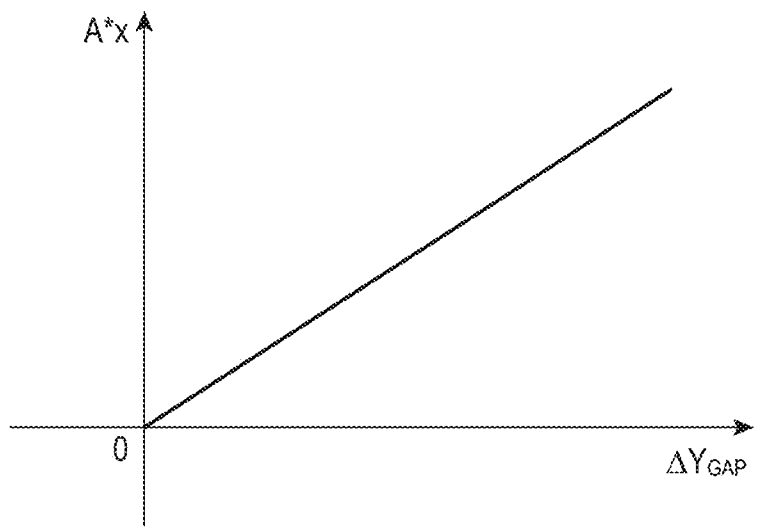
FIG. 2A is a diagram illustrating an example of a map which is used to calculate target deceleration.

Hereinafter, exemplary embodiments will be described with reference to the accompanying drawings. In the following description, the same or corresponding elements will be referred to by the same reference signs and description thereof will not be repeated.

First Embodiment

FIG. 1 is a functional block diagram of a host vehicle 2 including a driving support device 1 according to a first embodiment. As illustrated in FIG. 1, the driving support device 1 is mounted in a host vehicle 2 such as a car. The driving support device 1 performs steering control and deceleration control for avoiding an object which is detected in front of the host vehicle 2. Examples of the object include a stationary object (a fixed obstacle) and a mobile object (a moving obstacle).

Examples of the stationary object include road surface paint (including a lane boundary such as a white line or a yellow line) and a structure (such as a curbstone, a pole, a utility pole, a building, a sign, or a tree). Examples of the mobile object include a pedestrian, a bicycle, a baby carriage, and an object vehicle. The host vehicle 2 includes an internal sensor 3, a GPS receiver unit 4, an external sensor 5, a map database 6, a navigation system 7, an actuator 9, and an electronic control unit (ECU) 10.

The internal sensor 3 is a detection device that detects a traveling state of the host vehicle 2. The internal sensor 3 includes, for example, a vehicle speed sensor, an acceleration sensor, and a yaw rate sensor. The vehicle speed sensor is a detector that detects a speed of the host vehicle 2. For example, a wheel speed sensor is used as the vehicle speed sensor. The acceleration sensor is a detector that detects acceleration of the host vehicle 2. The acceleration sensor may include a longitudinal acceleration sensor that detects acceleration in a longitudinal direction of the host vehicle 2 and a lateral acceleration sensor that detects acceleration in a lateral direction of the host vehicle 2. The yaw rate sensor is a detector that detects a yaw rate (a rotation angular velocity) around a vertical axis passing through the center of gravity of the host vehicle 2. For example, a gyro sensor can be used as the yaw rate sensor.

The GPS receiver unit 4 receives signals from three or more GPS satellites and acquires position information indicating the position of the host vehicle 2. The position information includes, for example, latitude and longitude. Another method or system that can identify latitude and longitude of the location of the host vehicle 2 may be used instead of the GPS receiver unit 4.

The external sensor 5 is a detection device that detects surroundings of the host vehicle 2. The external sensor 5 detects a front object on a road on which the host vehicle 2 is traveling. The external sensor 5 includes at least one of a camera and a radar sensor. The camera is an imaging device that images the surroundings of the host vehicle 2. The camera is provided, for example, behind a front windshield of the host vehicle 2. The camera acquires imaging information on the surroundings of the host vehicle 2. The camera may be a monocular camera or may be a stereo camera. The stereo camera includes two imaging units that are arranged to reproduce binocular parallax. Information in a depth direction is also included in the imaging information of the stereo camera. The radar sensor is a detection device that detects an object near the host vehicle 2 using radio waves (for example, millimeter waves) or light. The radar sensor includes, for example, a millimeter wave radar or a laser imaging detection and ranging (LIDAR). The radar sensor detects an object by transmitting radio waves or light to the surroundings of the host vehicle 2 and receiving radio waves or light which is reflected from the object.

The map database 6 is a storage device that stores map information. The map database 6 is stored, for example, in a hard disk drive (HDD) which is mounted in the host vehicle 2. The map database 6 stores road information including information of stationary objects, traffic rules, positions of traffic signals, and road widths as map information. Some of the map information stored in the map database 6 may be stored in a storage device other than the HDD in which the map database 6 is stored. Some or all of the map information stored in the map database 6 may be stored in a storage device other than the storage device which is provided in the host vehicle 2.

The navigation system 7 is a system that guides a driver of the host vehicle 2 to a destination which is set in advance. The navigation system 7 recognizes a road and a travel lane in which the host vehicle 2 is traveling based on the position of the host vehicle 2 measured by the GPS receiver unit 4 and the map information in the map database 6. The navigation system 7 calculates a target route from the position of the host vehicle 2 to a destination and guides the driver along the target route using a human-machine interface (HMI).

The actuator 9 is a device that performs steering control and deceleration control of the host vehicle 2. The actuator 9 includes at least an engine actuator, a brake actuator, and a steering actuator. The engine actuator controls a drive force of the host vehicle 2 by changing an amount of air supplied to the engine (for example, changing a throttle opening) in accordance with a control signal input thereto. When the host vehicle 2 is a hybrid vehicle or an electric vehicle, the engine actuator controls a drive force from a motor which is a power source.

The ECU 10 is an electronic control unit including a central processing unit (CPU), a read only memory (ROM), a random access memory (RAM), and a controller area network (CAN) communication circuit. The ECU 10 is connected to a communication network via the CAN communication circuit and is communicatively connected to the above-mentioned elements of the host vehicle 2. For example, the ECU 10 performs inputting and outputting of data by operating the CAN communication circuit based on a signal which is output from the CPU and realizes various functions by loading a program stored in the ROM to the RAM and executing the program loaded to the RAM. The ECU 10 may include a plurality of electronic control units. The ECU 10 constitutes the driving support device 1.

The ECU 10 calculates a target lateral distance $Y_{GAP}^*$, and sets target deceleration $A_x^*$ to be greater as a lateral distance restraint value $\Delta Y_{GAP}$ increases when the target lateral distance $Y_{GAP}^*$ is less than a threshold value $\alpha$. The target lateral distance $Y_{GAP}^*$ is a lateral distance between the host vehicle 2 and an object when the host vehicle 2 passes by the object and is a lateral distance which is a target of steering control which is performed by the driving support device 1. The threshold value α is determined and stored in advance. The threshold value α may be determined to be constant for all objects. The threshold value α may be a value which varies depending on the vehicle speed of the host vehicle 2. The threshold value α is a lateral distance at which an occupant of the host vehicle 2 does not feel uncomfortable or in danger when the host vehicle 2 passes by an object without deceleration. The threshold value α may be a lateral distance at which a pedestrian or an occupant of another vehicle which are types of objects does not feel uncomfortable or in danger. The lateral distance restraint value $\Delta Y_{GAP}$ is a difference which is obtained by subtracting the target lateral distance $Y_{GAP}^*$ from the threshold value α. The target deceleration $A_x^*$ is deceleration of the host vehicle 2 when the host vehicle 2 passes by an object and is deceleration which is a target of deceleration control which is performed by the driving support device 1.

The ECU 10 includes a threshold value calculating unit (a first processing unit) 11, a risk potential field calculating unit (a second processing unit) 12, a valley search unit (a third processing unit) 13, a target deceleration calculating unit (a fourth processing unit) 14, and a travel control unit 15 as functional units.

The threshold value calculating unit 11 acquires the threshold value c for each of one or more objects depending on types of the one or more objects. Specifically, the threshold value calculating unit 11 detects one or more objects of which a distance from the host vehicle 2 is equal to or less than a predetermined first distance based on the positions of the objects detected by the external sensor 5. The predetermined first distance is defined as the vehicle speed of the host vehicle 2×an avoidance determination TTC. The avoidance determination TTC is a time to collision (TTC) for avoidance determination and is determined and stored in advance. The time to collision is an index indicating the number of seconds until the host vehicle 2 collides with the corresponding object. The threshold value calculating unit 11 determines that one or more objects of which the distance from the host vehicle 2 is equal to or less than the predetermined first distance are in a "quasi-valid state" and calculates the threshold value α of the corresponding object, for example, from a map which is preset depending on the type of the object.

The risk potential field calculating unit 12 calculates a risk potential field based on the outputs of the internal sensor 3, the GPS receiver unit 4, the external sensor 5, the map database 6, the navigation system 7, and the threshold value calculating unit 11. That is, the risk potential field calculating unit 12 calculates a risk potential field based on the vehicle speed of the host vehicle 2, the position of the host vehicle 2, a road width of a road on which the host vehicle 2 is traveling, and positions of one or more objects.

Specifically, the risk potential field calculating unit 12 calculates a road potential field Ur using Expression (1) based on a variance value of the road potential field (a constant for determining a gradient of a potential) r selected from a preset map, the position of the host vehicle 2 measured by the GPS receiver unit 4, and a road width included in the map information of the map database 6. The road potential field Ur is a repulsive potential with respect to a road (or lane) boundary. A lateral position $y_s$ is set and stored in advance. Here, y denotes a position in a y direction which is a lateral direction and x denotes a position in an x direction which is a longitudinal direction (a travel direction).

$$Ur(x,y)=(1-\exp(-(y-y_s)^2/2\sigma_r^2)) \quad (1)$$

$y_s$: a lateral position in a normative driver's line selection with respect to center information in a width direction of a road The risk potential field calculating unit 12 determines variance values $\sigma_{ox}$ and $\sigma_{oy}$ of potentials in the x direction and the y direction which are calculated from the vehicle speed of the host vehicle 2. The variance values $\sigma_{ox}$ and $\sigma_{oy}$ of potentials in the x direction and the y direction are selected from a preset map. The risk potential field calculating unit 12 calculates a single potential field Uo using Expression (2) based on the variance values $\sigma_{ox}$ and $\sigma_{oy}$ of potentials in the x direction and the y direction and the position of the corresponding object. The single potential field Uo is a repulsive potential with respect to a single object. $(x_0, y_0)$ denotes coordinates of the position of the object.

$$Uo(x,y)=\exp(-(x-x_o)^2/\sigma_{ox}^2-(y-y_o)^2/\sigma_{oy}^2) \quad (2)$$

The risk potential field calculating unit 12 calculates a risk potential field as a total potential field using Expression (3) from the total sum of the single potential fields Uo of all the detected objects and the road potential field Ur.

Risk potential field=total sum of single potential fields Uo of all objects+road potential field Ur (3)

The valley search unit 13 calculates a target lateral distance $Y_{GAP}^*$ and a lateral distance restraint value $\Delta Y_{GAP}$ for one or more objects based on the outputs of the internal sensor 3, the GPS receiver unit 4, and the risk potential field calculating unit 12. The valley search unit 13 calculates the target lateral distance $Y_{GAP}^*$ and the lateral distance restraint value $\Delta Y_{GAP}$ for one or more objects based on the vehicle speed of the host vehicle 2, the position of the host vehicle 2, the risk potential field, and the threshold values a for one or more objects.

Specifically, when one or more objects of which a distance from the host vehicle 2 is equal to or less than a predetermined second distance less than the predetermined first distance are detected, the valley search unit 13 determines that the one or more objects are in an "effective state" and calculates an avoidance path (a path through a lowest valley position) by valley search from the total potential field. The predetermined second distance is equal to the vehicle speed of the host vehicle 2× control trigger TTC. The control trigger TTC is a time to collision for control start and is determined and stored in advance. The control trigger TTC is less than the avoidance determination TTC. Valley search involves calculating a position to which the host vehicle 2 moves an arbitrary distance (the number of seconds×the vehicle speed of the host vehicle 2) from the position thereof and which is a lowest valley position at which a valley of the total potential field is the lowest. Various known techniques can be employed for valley search. The valley search unit 13 calculates a target steering angle $\theta_{sw}^*$ using Expression (4) based on the calculated avoidance path. $Gain_\theta$ denotes a constant which is calculated in advance from a skilled driver's manual driving data and is stored as a map.

Target steering angle $\theta_{sw}^*$=$Gain_\theta$×lowest valley position (4)

When one or more objects of which a distance from the host vehicle 2 is equal to or less than the predetermined second distance are detected, the valley search unit 13 calculates a target lateral distance $Y_{GAP}*$ by valley search from the total potential field. The valley search unit 13 calculates a lateral distance restraint value $\Delta Y_{GAP}(k)$ of the k-th object $T_k$ using Expression (5) based on the calculated target lateral distance $Y_{GAP}*$ and the threshold value $\alpha$ input from the threshold value calculating unit 11 via the risk potential field calculating unit 12. Here, k is an integer equal to or greater than 1.

Lateral distance restraint value $\Delta Y_{GAP}(k)$=threshold value $\alpha(k)$–target lateral distance $Y_{GAP}*(k)$     (5)

The target deceleration calculating unit 14 calculates target deceleration $A_x*$. The target deceleration calculating unit 14 sets the target deceleration $A_x*(k)$ to be greater as the lateral distance restraint value $\Delta Y_{GAP}(k)$ increases when the target lateral distance $Y_{GAP}*(k)$ is less than the threshold value $\alpha$. Specifically, when the target lateral distance $Y_{GAP}*(k)$ is less than the threshold value $\alpha$, the target deceleration calculating unit 14 calculates the target deceleration $A_x*(k)$ for the k-th object $T_k$, for example, based on the lateral distance restraint value $\Delta Y_{GAP}$ from a first deceleration map illustrated as a graph in FIG. 2A. The first deceleration map is set and stored in advance. In the first deceleration map, the horizontal axis represents the lateral distance restraint value $\Delta Y_{GAP}$, and the vertical axis represents the target deceleration $A_x*$. In the first deceleration map, as the lateral distance restraint value $\Delta Y_{GAP}$ increases, the target deceleration $A_x*$ is set to increase. In the first deceleration map, as the lateral distance restraint value $\Delta Y_{GAP}$ increases, the target deceleration $A_x*$ may be set to increase quadratically or exponentially.

Figure 2B:
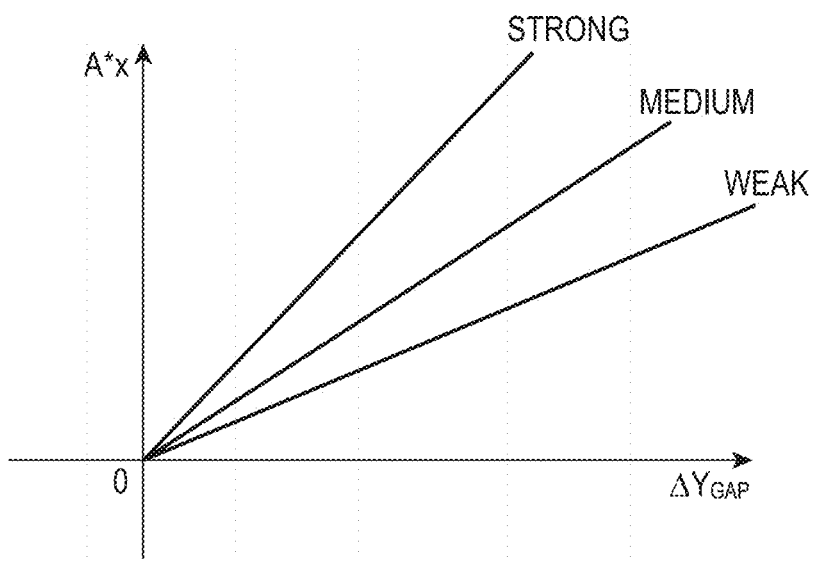
FIG. 2B is a diagram illustrating an example of another map which is used to calculate target deceleration.

In addition, the target deceleration calculating unit 14 may change the level of the target deceleration $A_x*$ based on an occupant's sensitivity. Accordingly, acceptability to the occupant can be secured. For example, the target deceleration calculating unit 14 may change the target deceleration $A_x*$ based on the lateral distance restraint value $\Delta Y_{GAP}$ and the sensitivity level (strong, medium, and weak) from a second deceleration map illustrated as a graph in FIG. 2B. Here, the sensitivity is a degree of a response to a stimulus which is applied to an occupant such as a driver. In the second deceleration map, the horizontal axis represents the lateral distance restraint value $\Delta Y_{GAP}$, and the vertical axis represents the target deceleration $A_x*$. In the second deceleration map, the slope of the target deceleration $A_x*$ is greater on a side with a sensitivity level of "medium" than on a side with a sensitivity level of "weak" and the slope of the target deceleration $A_x*$ is greater on a side with a sensitivity level of "strong" than on a side with a sensitivity level of "medium." A known technique can be used for the sensitivity level and detection thereof.

The travel control unit 15 performs steering control (lateral control) and deceleration control (longitudinal control) using the actuator 9 based on the target steering angle $\theta_{sw}*$ calculated by the valley search unit 13 and the target deceleration $A_x*$ calculated by the target deceleration calculating unit 14. Specifically, the travel control unit 15 outputs a control signal based on the target steering angle $\theta_{sw}*(k)$ and the target deceleration $A_x*(k)$ to the actuator 9 and performs steering control and deceleration control for avoiding the k-th object $T_k$ which is detected in front of the host vehicle 2.

When the host vehicle 2 is a vehicle which travels by automated driving, the travel control unit 15 generates a travel plan satisfying the target steering angle $\theta_{sw}*$ and the target deceleration $A_x*$ and outputs a control signal based on the generated travel plan to the actuator 9. Accordingly, the travel control unit 15 performs automated driving control including the steering control and the deceleration control. Known techniques can be used for the travel plan and generation thereof. Automated driving is vehicle control for causing the host vehicle 2 to travel to a preset destination automatically. The destination may be set by an occupant such as a driver or may be automatically set by the host vehicle 2. In automated driving, an occupant does not need to perform a driving operation and the host vehicle 2 travels automatically.

When one or more objects of which the distance from the host vehicle 2 is equal to or less than the predetermined first distance are detected, the ECU 10 periodically repeatedly performs the processing of the threshold value calculating unit 11 and the risk potential field calculating unit 12. When one or more objects of which the distance from the host vehicle 2 is equal to or less than the predetermined second distance less than the predetermined first distance, the ECU 10 periodically repeatedly performs the processing of the valley search unit 13 and the target deceleration calculating unit 14. Details thereof will be described later.

An example of a process flow which is performed by the ECU 10 in the driving support device 1 will be described below with reference to the flowcharts illustrated in FIGS. 3 and 4. The ECU 10 starts the process flow, for example, when a support execution button or the like is turned on by an occupant's operation.

As illustrated in FIG. 3, in the ECU 10, the threshold value calculating unit 11 determines whether a k-th object $T_k$ of which the distance from the host vehicle 2 is equal to or less than the predetermined first distance has been detected (Step S1). When the determination result of Step S1 is YES, the threshold value calculating unit 11 determines that the k-th object $T_k$ of which the distance from the host vehicle 2 is equal to or less than the predetermined first distance is in the "quasi-valid state," and acquires the threshold value $\alpha$ for the k-th object $T_k$ (Step S2). The risk potential field calculating unit 12 calculates a road potential field Ur (Step S3). The risk potential field calculating unit 12 calculates a single potential field Uo for the k-th object $T_k$ (Step S4). The risk potential field calculating unit 12 calculates a risk potential field (Step S5). When the determination result of Step S1 is NO or after Step S5, the process of Step S in a next cycle is performed.

Figure 4:
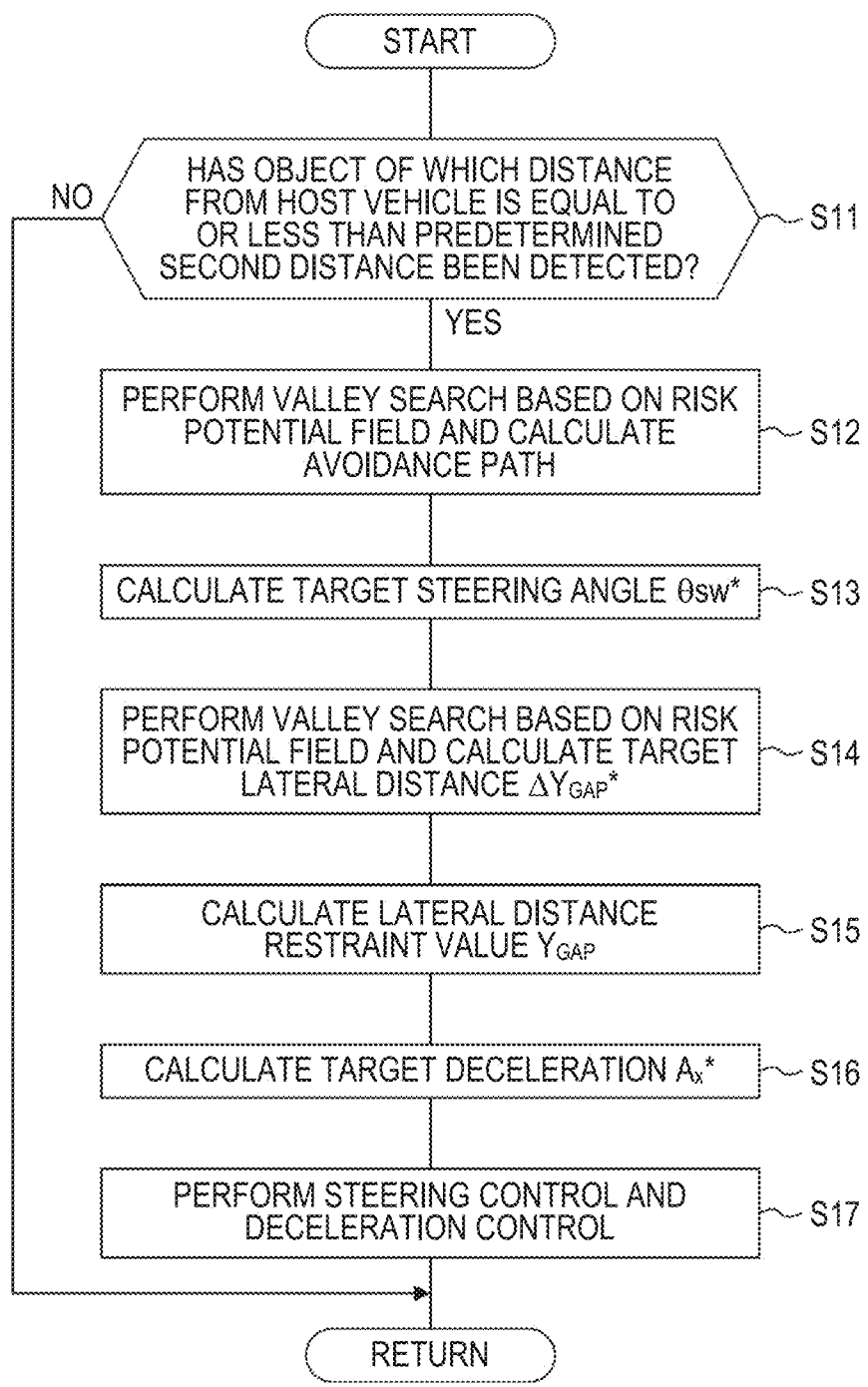
FIG. 4 is a flowchart illustrating another process flow which is performed by the driving support device according to the first embodiment.

As illustrated in FIG. 4, in the ECU 10, the valley search unit 13 determines whether a k-th object $T_k$ of which the distance from the host vehicle 2 is equal to or less than the predetermined second distance has been detected (Step S11). When the determination result of Step S11 is YES, the valley search unit 13 determines that the k-th object $T_k$ of which the distance from the host vehicle 2 is equal to or less than the predetermined second distance is in the "valid state," and performs valley search based on the risk potential field calculated in Step S5 to calculate an avoidance path (Step S12). The valley search unit 13 calculates a target steering angle $\theta_{sw}*$ (Step S13). The valley search unit 13 performs valley search based on the risk potential field calculated in Step S5 to calculate a target lateral distance $Y_{GAP}*(k)$ for the k-th object $T_k$ (Step S14). The valley search unit 13 calculates a lateral distance restraint value $\Delta Y_{GAP}(K)$ for the k-th object $T_k$ (Step S15).

The target deceleration calculating unit 14 calculates target deceleration $A_x*(k)$ for the k-th object $T_k$ (Step S16). Specifically, when the target lateral distance $Y_{GAP}*(k)$ is less than the threshold value $\alpha$, the target deceleration calculating unit 14 calculates the target deceleration $A_x*(k)$ to be greater as the lateral distance restraint value $\Delta Y_{GAP}(k)$ becomes greater. On the other hand, when the target lateral distance $Y_{GAP}*(k)$ is equal to or greater than the threshold value $\alpha$, the target deceleration calculating unit 14 calculates target deceleration $A_x*(k)$ for normal deceleration control, for example, based on the surroundings and the traveling state of the host vehicle 2.

The travel control unit 15 inputs a control signal based on the target steering angle $\theta_{sw}*(k)$ and the target deceleration $A_x*(k)$ to the actuator 9 and performs steering control and deceleration control for avoiding the k-th object $T_k$ (Step S17). When the determination result of Step S11 is NO or after Step S17, the process of Step S11 in a next cycle is performed. The ECU 10 ends the process flow, for example, when the support execution button or the like is turned off by an occupant's operation.

Figure 5A:
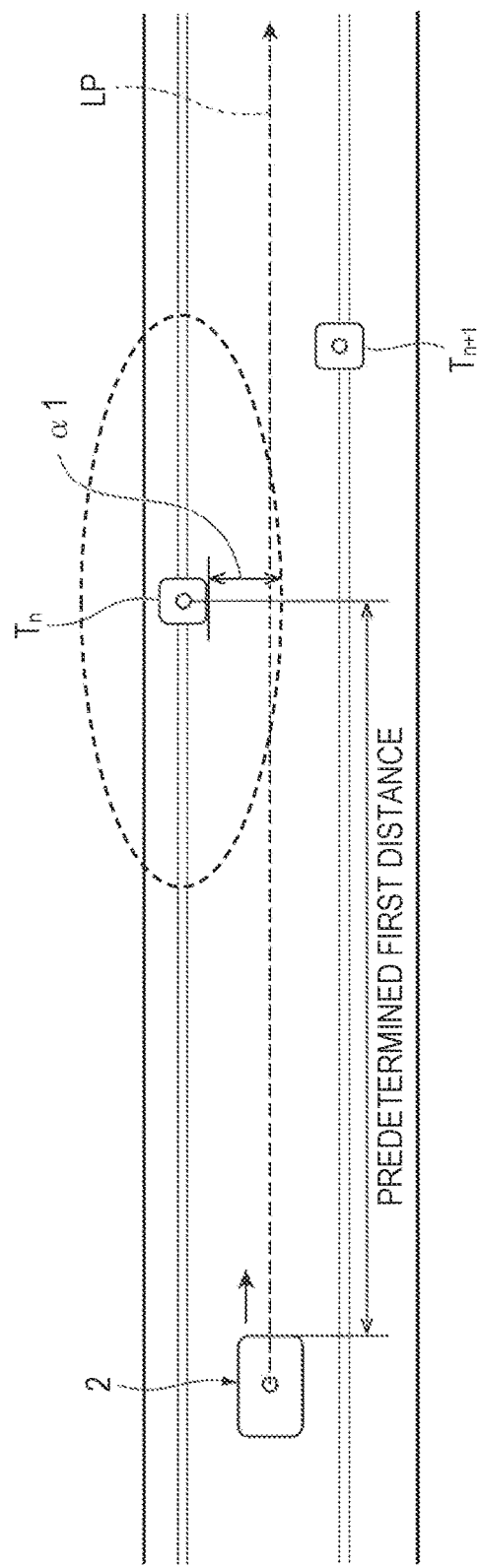
FIG. 5A is a diagram illustrating an example in which a plurality of objects is avoided by the driving support device according to the first embodiment.
Figure 5B:
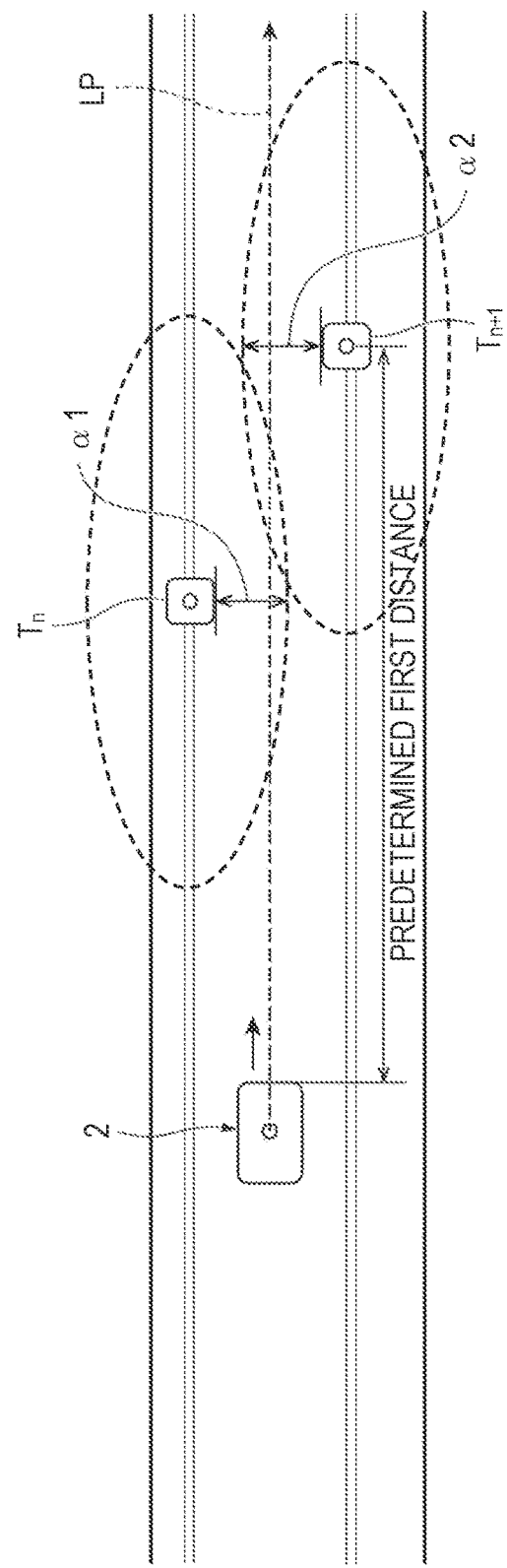
FIG. 5B is a diagram illustrating a scenario subsequent to FIG. 5A.

FIG. 5A is a diagram illustrating an example in which a plurality of objects (an n-th object $T_n$ and an (n+1)-th object $T_{n+1}$) is avoided by the driving support device 1. FIG. 5B is a diagram illustrating a scenario subsequent to FIG. 5A. FIG. 6A is a diagram illustrating a scenario subsequent to FIG. 5B. FIG. 6B is a diagram illustrating a scenario subsequent to FIG. 6A.

In the illustrated example, the host vehicle 2 is traveling in a scheduled travel route LP which extends straightly along a road. In the driving support device 1, when a distance between the n-th object and the host vehicle 2 is equal to or less than the predetermined first distance as illustrated in FIG. 5A, it is determined that the n-th object is in a quasi-valid state (for example, a flag thereof is "quasi-valid") and the single potential field Uo of the n-th object is added to the risk potential field. A threshold value $\alpha 1$ which is the threshold value $\alpha$ for the n-th object is calculated. At this time, steering control and deceleration control are not yet performed and the scheduled travel route LP still extends in a straight shape.

Subsequently, when the host vehicle 2 continues to travel and a distance between the (n+1)-th object and the host vehicle 2 is equal to or less than the predetermined first distance as illustrated in FIG. 5B, it is determined that the (n+1)-th object is in a quasi-valid state and the single potential field Uo of the (n+1)-th object is added to the risk potential field. A threshold value $\alpha 2$ which is the threshold value $\alpha$ for the (n+1)-th object is calculated. At this time, the distance between the n-th object and the host vehicle 2 is greater than the predetermined second distance. Steering control and deceleration control are not yet performed and the scheduled travel route LP still extends in a straight shape.

Subsequently, when the host vehicle 2 continues to travel and a distance between the n-th object and the host vehicle 2 is equal to or less than the predetermined second distance as illustrated in FIG. 6A, it is determined that the n-th object is in a valid state (for example, the flag is "valid"), and the target steering angle $\theta_{sw}*$, the target lateral distance $Y_{GAP}*(n)$, and the lateral distance restraint value $\Delta Y_{GAP}(n)$ are calculated using a valley search model. Then, the target deceleration calculating unit 14 calculates target deceleration $A_x*(n)$. Steering control and deceleration control for avoiding the n-th object $T_1$ are performed. The scheduled travel route LP extends in a smooth curve shape for avoiding the n-th object $T_n$ with the target lateral distance $Y_{GAP}*(n)$.

Subsequently, when the host vehicle 2 continues to travel and the distance between the (n+1)-th object and the host vehicle 2 is equal to or less than the predetermined second distance as illustrated in FIG. 6B, it is determined that the (n+1)-th object is in a valid state, and the target steering angle $\theta_{sw}*$, the target lateral distance $Y_{GAP}*(n)$, the target lateral distance $Y_{GAP}*(n+1)$, the lateral distance restraint value $\Delta Y_{GAP}(n)$, and the lateral distance restraint value $\Delta Y_{GAP}(n+1)$ are calculated using a valley search model. Then, the target deceleration calculating unit 14 calculates target deceleration $A_x*(n)$ and target deceleration $A_x*(n+1)$. Steering control and deceleration control for avoiding the (n+1)-th object $T_{n+1}$ in addition to the n-th object T are performed. The scheduled travel route LP extends in a smooth curve shape for avoiding the n-th object $T_n$ with the target lateral distance $Y_{GAP}*(n)$ and avoiding the (n+1)-th object $T_{n+1}$ with the target lateral distance $Y_{GAP}*(n+1)$.

In the driving support device 1, when the target lateral distance $Y_{GAP}*(k)$ of steering control is less than the threshold value $\alpha$, the target deceleration $A_x*(k)$ in deceleration control is set to be greater as the lateral distance restraint value $\Delta Y_{GAP}(k)$ becomes greater. Accordingly, when steering control and deceleration control for avoiding the k-th object $T_k$ are performed, it is possible to prevent the host vehicle 2 from passing through a position closer to the k-th object $T_k$ at a high speed and to prevent an occupant of the host vehicle 2 from feeling uncomfortable.

The driving support device 1 includes the threshold value calculating unit 11 that acquires the threshold value $\alpha$ for each object, the risk potential field calculating unit 12 that calculates a risk potential field, the valley search unit 13 that calculates a target lateral distance $Y_{GAP}*(k)$ and a lateral distance restraint value $\Delta Y_{GAP}(k)$, and the target deceleration calculating unit 14 that calculates target deceleration $A_x*(k)$ based on the lateral distance restraint value $\Delta Y_{GAP}(k)$. Accordingly, steering control using the risk potential field and deceleration control linked thereto become possible.

In the driving support device 1, when a k-th object $T_k$ of which the distance from the host vehicle 2 is equal to or less than the predetermined first distance has been detected, the processing of the threshold value calculating unit 11 and the risk potential field calculating unit 12 is periodically repeatedly performed. When a k-th object $T_k$ of which the distance from the host vehicle 2 is equal to or less than the predetermined second distance less than the predetermined first distance has been detected, the processing of the valley search unit 13 and the target deceleration calculating unit 14 is periodically repeatedly performed. Accordingly, for example, when there is a plurality of objects of which the distance from the host vehicle 2 is equal to or less than the predetermined first distance, it is possible to calculate a risk potential field in which the plurality of objects is considered as an avoidance target. Accordingly, for example, when the n-th object T is avoided, a target lateral distance $Y_{GAP}*(n)$ can be calculated in consideration of avoidance of the (n+1)-th object $T_{n+1}$. It is possible to smoothly avoid the plurality of objects $T_n$ and $T_{n+1}$.

The processing of the valley search unit 13 and the target deceleration calculating unit 14 is performed after the k-th object $T_k$ of which the distance from the host vehicle 2 is equal to or less than the predetermined second distance has been detected, not after the k-th object $T_k$ of which the distance from the host vehicle 2 is equal to or less than the predetermined first distance has been detected. Accordingly, it is possible to curb an increase in a calculation load. It is possible to calculate the target lateral distance $Y_{GAP}*$ and the target deceleration $A_x*$ based on the situation of the host vehicle 2 at a time point at which steering control and deceleration control for avoiding the k-th object $T_k$ are started in the host vehicle 2. Accordingly, an optimal target lateral distance $Y_{GAP}*(n+1)$ and an optimal target deceleration $A_x*(n+1)$ for the (n+1)-th object $T_{n+1}$ can be calculated based on the position and the vehicle speed of the host vehicle 2 which vary when the n-th object $T_n$ is avoided. It is possible to enhance safety.

With the driving support device 1, it is possible to uniquely determine the target deceleration based on an amount of lateral avoidance in performing steering control and deceleration control. It is possible to resolve excess or deficiency of the deceleration with respect to the amount of lateral avoidance. When lateral distance restraint value $\Delta Y_{GAP} \leq 0$ is satisfied, a risk can be avoided using only steering. When lateral distance restraint value $\Delta Y_{GAP} > 0$ is satisfied, a risk cannot be avoided using only steering and thus it is possible to cope with the avoidance in combination of steering control and deceleration control.

Second Embodiment

A second embodiment will be described below. Differences of the second embodiment from the first embodiment will be described and repeated description will be omitted.

Figure 7:
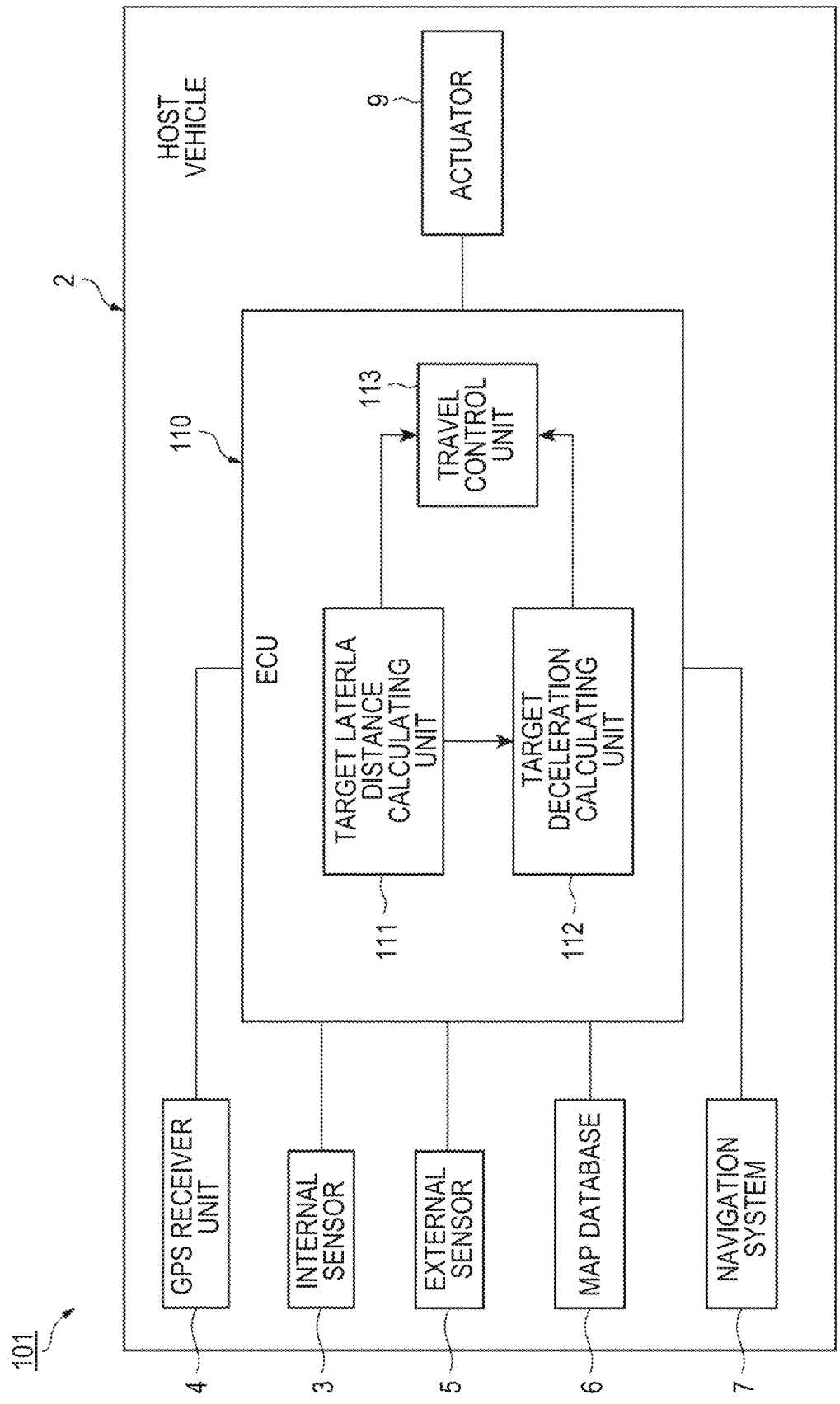
FIG. 7 is a functional block diagram of a host vehicle including a driving support device according to a second embodiment.

FIG. 7 is a functional block diagram of a host vehicle 2 including a driving support device 101 according to the second embodiment. As illustrated in FIG. 7, the driving support device 101 according to this embodiment is different from the driving support device 1, in that an ECU 110 is provided instead of the ECU 10 (FIG. 1).

The ECU 110 includes a target lateral distance calculating unit 111, a target deceleration calculating unit 112, and a travel control unit 113. The target lateral distance calculating unit 111 calculates a target lateral distance YH(k) which varies according to a vehicle speed of the host vehicle 2 based on the outputs of the internal sensor 3, the GPS receiver unit 4, the external sensor 5, the map database 6, and the navigation system 7.

The target deceleration calculating unit 112 sets target deceleration AH(k) to be greater as a difference $\Delta$YH(k) obtained by subtracting the target lateral distance YH(k) calculated by the target lateral distance calculating unit 111 from a threshold value a becomes greater when the target lateral distance YH(k) is less than the threshold value α. The travel control unit 113 causes the actuator 9 to perform steering control and the deceleration control for avoiding an object detected in front of the host vehicle 2 based on the target lateral distance YH(k) calculated by the target lateral distance calculating unit 111 and the target deceleration AH(k) calculated by the target deceleration calculating unit 112.

With this driving support device 101, it is also possible to achieve the same advantages as in the first embodiment, that is, to achieve an advantage of preventing an occupant of the host vehicle 2 from feeling uncomfortable and the like.

Modified Example

While various exemplary embodiments have been described above, the disclosure is not limited to the exemplary embodiments and may be subjected to various omissions, substitutions, and modifications.

In the above-mentioned embodiments, the steps (Steps S14 and S15) of performing valley search based on the risk potential field to calculate the target lateral distance $Y_{GAP}*$ and to calculate the lateral distance restraint value $\Delta Y_{GAP}$ are performed after the steps (Steps S12 and S13) of performing valley search based on a risk potential field of various distances or less to calculate an avoidance path and to calculate the target steering angle $\theta_{sw}*$ have been performed, but these steps may be performed in different order.

In the above-mentioned embodiments, when the predetermined second distance is less than the predetermined first distance, the predetermined first distance and the predetermined second distance are not particularly limited.

What is claimed is:

1. A driving support device for a host vehicle, comprising an electronic control unit configured to:
    calculate a target lateral distance between the host vehicle and an object when the host vehicle passes by the object;
    perform a steering control based on the target lateral distance;
    perform a deceleration control based on a target deceleration which is a deceleration of the host vehicle when the host vehicle passes by the object;
    calculate a difference by subtracting the target lateral distance from a predetermined threshold value when the target lateral distance is less than the threshold value;
    increase the target deceleration as the difference increases;
    when a plurality of objects are detected, acquire predetermined threshold values for each of the plurality of objects;
    calculate a risk potential field based on a variance value of a road potential field selected from a preset map, a position of the host vehicle, and a road width included in a map database;
    calculate the target lateral distance and the difference for each of the plurality of objects based on the vehicle speed of the host vehicle, the position of the host vehicle, the risk potential field, and the predetermined threshold value for each of the objects; and
    increase the target deceleration of the host vehicle approaching at least one of the plurality of objects when the target lateral distance for the at least one of the plurality of objects is less than the predetermined threshold value.

2. The driving support device according to claim 1, wherein the electronic control unit is further configured to periodically
    acquire the predetermined threshold value and calculate the risk potential field when the at least one of the plurality of objects of which a distance from the host vehicle is equal to or less than a predetermined first distance is detected; and
    calculate the target lateral distance and increase the target deceleration when the at least one of the plurality of objects of which a distance from the host vehicle is equal to or less than a predetermined second distance less than the predetermined first distance are detected.

3. The driving support device according to claim 1, wherein the predetermined threshold value is a predetermined lateral distance when the host vehicle passes by the at least of one the objects without deceleration.

4. The driving support device according to claim 1, wherein:
    the at least one of the objects is a pedestrian; and
    the predetermined threshold value is a predetermined lateral distance when the host vehicle passes by the pedestrian without deceleration.

5. The driving support device according to claim 1, wherein:
    the at least one of the objects is another vehicle; and
    the predetermined threshold value is a predetermined lateral distance when the host vehicle passes by the another vehicle without deceleration.

6. A driving support device for a host vehicle comprising an electronic control unit configured to:
- when a plurality of objects are detected in front of the host vehicle, acquire predetermined threshold values for each of the plurality of objects;
- calculate a risk potential field based on a variance value of a road potential field selected from a present map, a position of the host vehicle, and a road width included in a map database;
- calculate a target lateral distance and a difference for each of the plurality of objects based on the vehicle speed of the host vehicle, the position of the host vehicle, the risk potential field, and the predetermined threshold value for each of the objects;
- increase a target deceleration of the host vehicle approaching at least one of the plurality of objects when the target lateral distance for the at least one the plurality of objects is less than the predetermined threshold value;
- perform a steering control based on the target lateral distance; and
- perform a deceleration control based on the target deceleration.

7. The driving support device according to claim 6, wherein the electronic control unit is further configured to periodically
- acquire the predetermined threshold value and calculate the risk potential field when the at least one of the plurality of objects of which a distance from the host vehicle is equal to or less than a predetermined first distance is detected; and
- calculate the target lateral distance and increase the target deceleration when the at least one of the plurality of objects of which a distance from the host vehicle is equal to or less than a predetermined second distance less than the predetermined first distance are detected.

8. The driving support device according to claim 6, wherein the predetermined threshold value is a predetermined lateral distance when the host vehicle passes by the at least of one the objects without deceleration.

9. The driving support device according to claim 6, wherein:
- the at least one of the objects is a pedestrian; and
- the predetermined threshold value is a predetermined lateral distance when the host vehicle passes by the pedestrian without deceleration.

10. The driving support device according to claim 6, wherein:
- the at least one of the objects is another vehicle; and
- the predetermined threshold value is a predetermined lateral distance when the host vehicle passes by the another vehicle without deceleration.

* * * * *